United States Patent [19]
Schmidt

[11] 3,791,170
[45] Feb. 12, 1974

[54] COUPLING

[75] Inventor: Richard Schmidt, Cincinnati, Ohio

[73] Assignee: The Tool Steep Gear & Pinion Company, Cincinnati, Ohio

[22] Filed: Nov. 7, 1972

[21] Appl. No.: 304,413

[52] U.S. Cl.............................. 64/19, 64/12, 64/31, 74/68
[51] Int. Cl............................................. F16d 3/70
[58] Field of Search ................. 64/19, 12, 31; 74/68

[56] References Cited
UNITED STATES PATENTS

| 268,807 | 12/1882 | Landis | 64/31 |
|---|---|---|---|
| 1,242,906 | 10/1917 | Augustine | 64/19 |
| 3,242,694 | 3/1966 | Schmidt | 64/31 |
| 3,664,153 | 5/1972 | Sugahara | 64/31 |

FOREIGN PATENTS OR APPLICATIONS

| 463,066 | 3/1937 | Great Britain | 64/12 |

Primary Examiner—Benjamin W. Wyche
Assistant Examiner—Randall Heald
Attorney, Agent, or Firm—Cushman, Darby & Cushman

[57] ABSTRACT

A coupling comprising three disk-like members arranged to provide a central member and outer members on opposite sides thereof and two pairs of parallel links pivotally interconnected between adjacent members, the members being of a shape which is symmetrical about an axis of rotation and the links being arranged symmetrically about the axis of rotation when the coupling is connected between two shafts in axial alignment, the coupling being operable to drivingly interconnect the shafts when in such alignment without vibration or when disposed or moved into various misaligned positions with a minimum of vibration and with constant angular output movement in response to constant angular input movement during each revolution.

12 Claims, 12 Drawing Figures

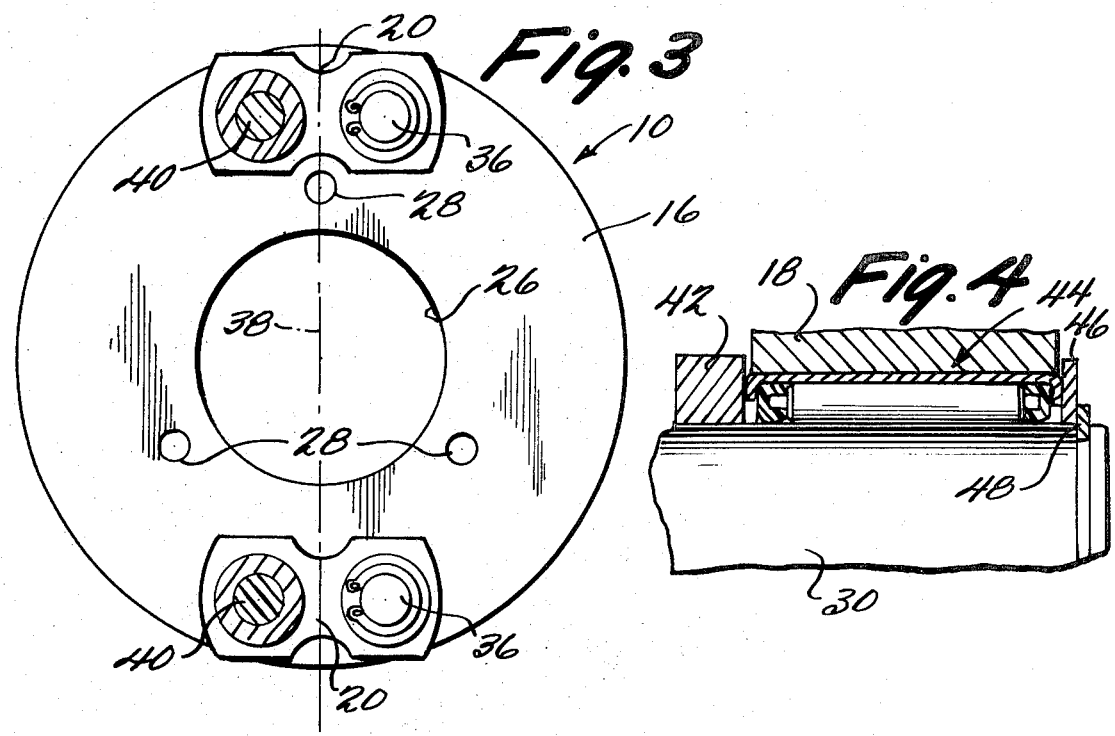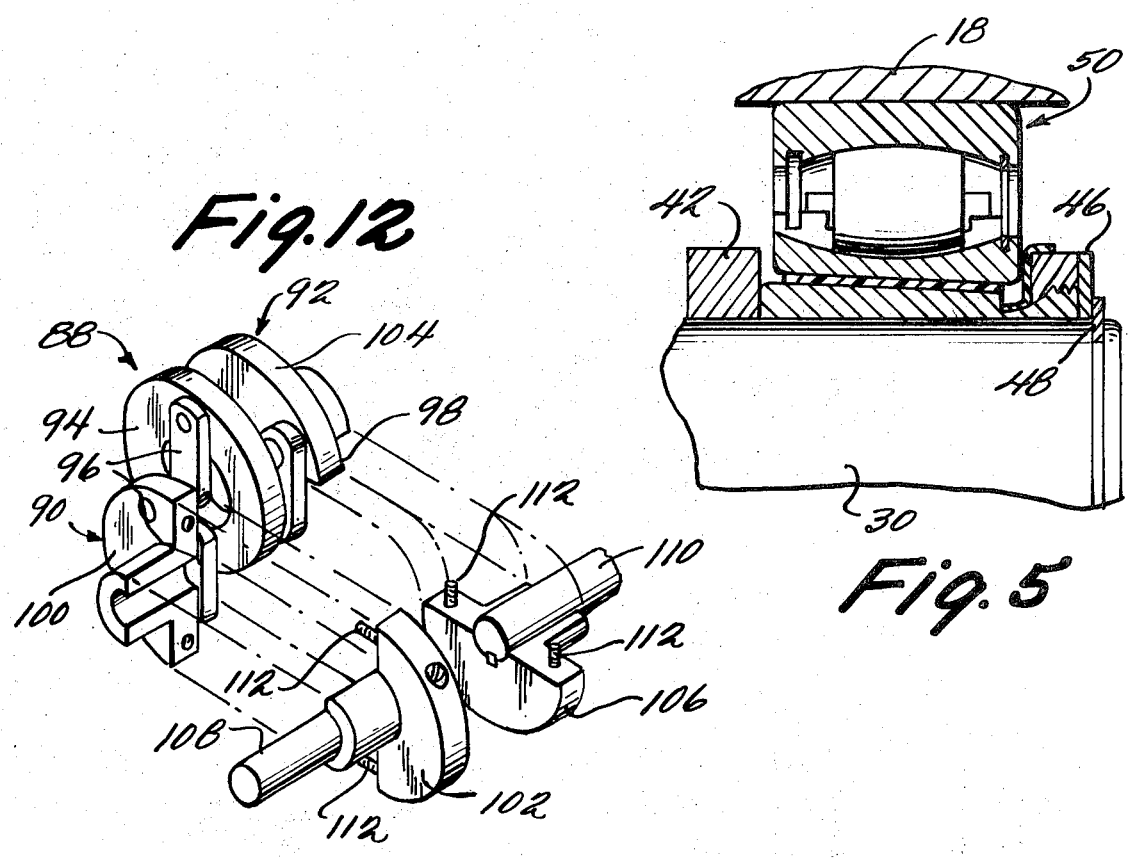

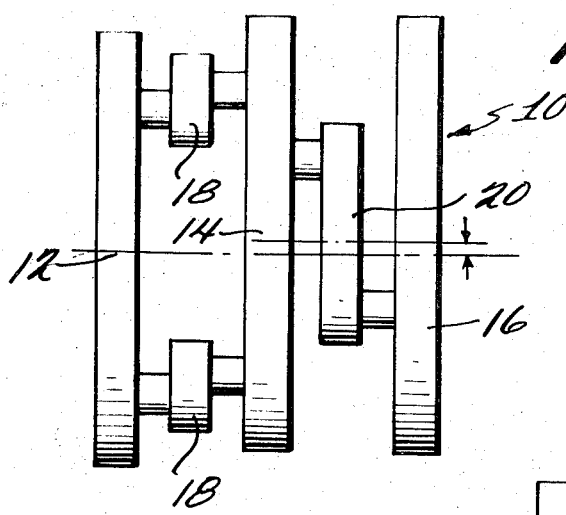
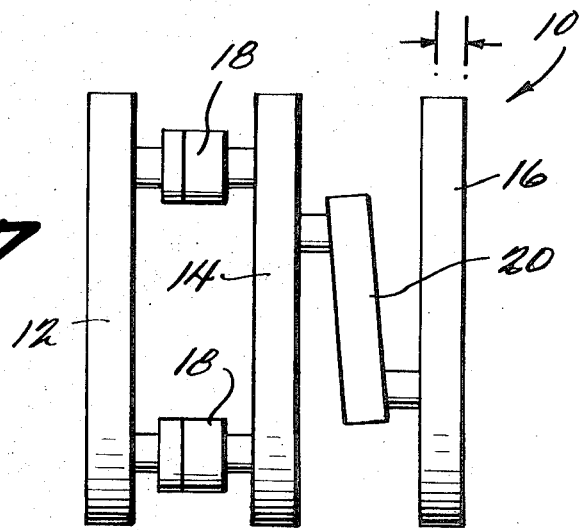
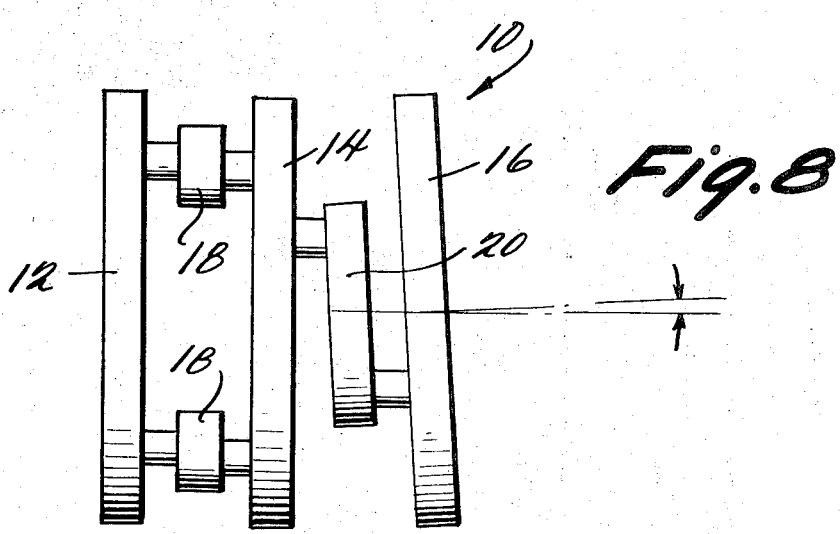

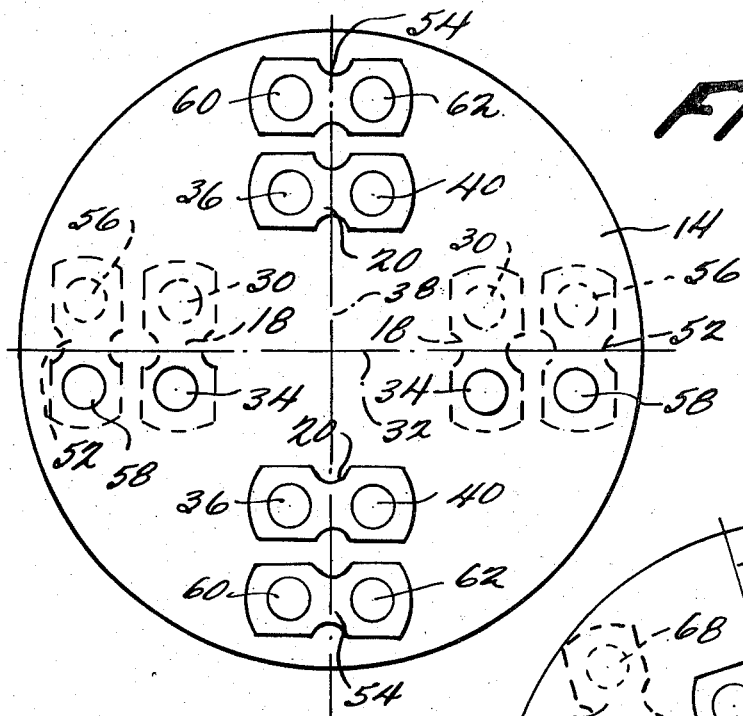
Fig. 9
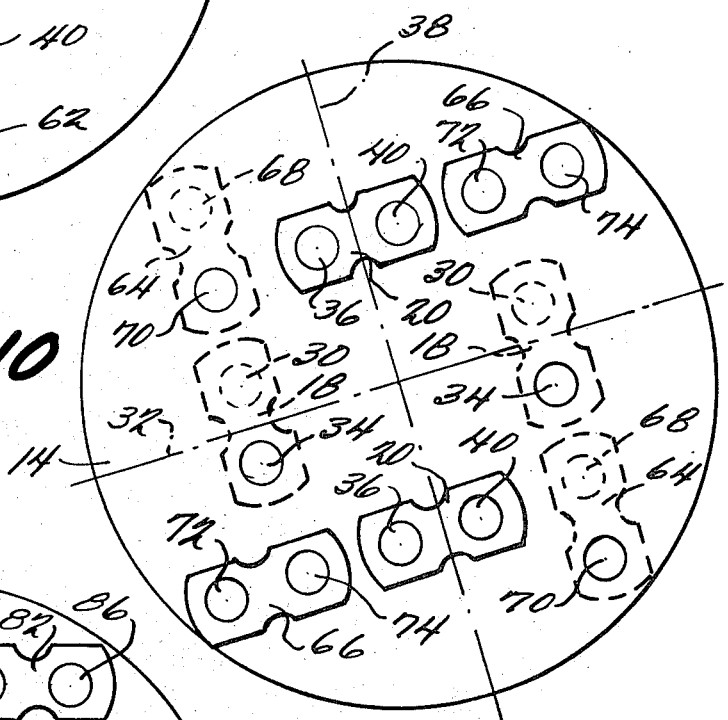
Fig. 10
Fig. 11

COUPLING

This invention relates to couplings and more particularly to couplings for drivingly interconnecting a pair of shafts or the like in axial alignment and axial misalignment operable to transmit therebetween high rotational speeds and torques.

The type of coupling herein contemplated is particularly for use in rotary motion transmission where axial misalignment of an extent greater than that normally accommodated by conventional flexible couplings, such couplings having resilient parts, and the like and/or for lesser misalignments requiring greater speed and torque transmission characteristics than can be practically provided by such flexible couplings.

Couplings of the type herein contemplated have long been proposed both in the patented and technical literature. A recent article entitled "Laterally Movable Couplings - Structural and Kinematic Systematization" by Duditza [Antriebstechnik 10 (1971) Nr 11 page 409] describes and illustrates a number of the known couplings and proposed variations thereof. One of the couplings illustrated therein (FIG. 36) referred to as the Alsthom coupling with variations thereof being shown in FIGS. 37-39. (See also U.S. Pat. No. 1,112,219.) This coupling has the advantage that the parts thereof are symmetrical about the rotational axis when connected between two shafts or the like which are in axial alignment. The coupling has the capability of transmitting high speed and high torque when in aligned relation without introducing any significant angular variation or vibrational imbalance to the system. Thus, in those instances where the shafts or the like to be interconnected by the coupling are in alignment, the Alsthom coupling will function quite well. However, in those instances where the shafts to be connected are misaligned, the operation of the Alsthom coupling will introduce angular variation and vibrational imbalance to the system which increases as the misalignment increases. These imbalances are introduced because the relative lateral movement between the three rotary members of the coupling which takes place to accommodate the misalignment includes, by virtue of the positioning of the interconnecting links therebetween, both a translational movement and an angular movement. The angular movement is particularly undesirable since it causes variations in the angular movement of the driven rotary member in response to a constant angular movement of the driving rotary member during each revolution, as well as causing a separate source of vibrational imbalance. However, the vibrational imbalance introduced by the relative angular movement, as well as the relative translational movement between the three members during high speed operation, is minimized by virtue of the symmetrical relation of the parts when aligned.

Another coupling illustrated (FIG. 30) in the aforesaid article is referred to as the Karger coupling and a variation thereof (FIG. 31) is referred to as the Krawtschenko coupling. (See also U.S. Pat. No. 1,832,300.) These couplings obviate some of the disadvantages of the Alsthom coupling but, in turn, introduce disadvantages which are not presented therein. By positioning the interconnecting links of the coupling in parallel relation between adjacent rotary members, the relative lateral movement between adjacent members during misaligned operation is limited to translational movement only, thus eliminating the introduction of angular movement and the resultant angular variation and vibrational imbalance occasioned thereby in the Alsthom coupling. However, as a result of change in the interconnection of the links, the symmetry is also changed. Thus, these couplings are not symmetrical about the axis of rotation when in aligned operation and therefore introduce vibrational imbalance to the system under circumstances where the Alsthom coupling would operate quite satisfactorily without such vibration. Moreover, this vibrational imbalance becomes greater as misalignment increases.

An object of the present invention is the provision of a coupling of the type described operable during high speed — high torque operation in aligned or misaligned relation to eliminate the disadvantages of all of the prior art couplings noted above, while retaining all of the advantages thereof, thus insuring substantially vibrationless high speed operation when in aligned relation and minimum vibration when in misaligned relation with constant angular output movement in response to constant angular input movement during each revolution.

In accordance with the principles of the present invention this object is obtained by utilizing parallel links to interconnect adjacent rotary members of the coupling, thereby limiting their relative lateral movement to a translational movement, arranging the links symmetrically with respect to the rotary members, each of which is shaped to be symmetrical about an axis coincident with the axis of rotation when the coupling is in aligned operation thereby substantially eliminating vibrational imbalancing on such operation and minimizing vibrational imbalance during misaligned operation.

Another object of the present invention is the provision of a coupling of the type described which is operable to accommodate misalignment not only as a result of laterally offset displacement between the connected shafts but axial offset displacement and angular offset displacement as well.

Another object of the present invention is the provision of a coupling of the type described which can be readily constructed to transmit unusually high torques of the nature referred to in U.S. Pat. No. 3,242,693 without the necessity of providing the elaborate elastic compensating structures thereof.

Another object of the present invention is the provision of a coupling of the type described having improved detachably fixed, split outer rotary members operable to be interconnected between two closely spaced shafts without the necessity of separating the shafts axially to effect the connection.

These and other objects of the present invention will become more apparent during the course of the following detailed description and appended claims.

The invention may best be understood with reference to the accompanying drawings wherein illustrative embodiments are shown.

In the drawings:

FIG. 3 is a sectional view taken along the line 3—3 of FIG. 1;

FIG. 4 is an enlarged fragmentary sectional view taken along the line 4—4 of FIG. 2 showing one form of bearing assembly utilized in the coupling of the present invention;

FIG. 5 is a view similar to FIG. 4 showing another form of bearing utilized in the coupling of the present invention;

FIGS. 6–8 are similar side elevational views showing the position of the parts of a coupling embodying the principles of the present invention when connecting shafts in parallel offset relation, in axially displaced relation, and in angular offset relation respectively;

FIG. 9 is an end view of another form of a coupling embodying the principles of the present invention, showing the same with the outer disk-like member removed;

FIGS. 10 and 11 are views similar to FIG. 9 of two further forms of couplings embodying the principles of the present invention; and FIG. 12 is an exploded isometric view of still another form of coupling embodying the principles of the present invention.

Figure 1:
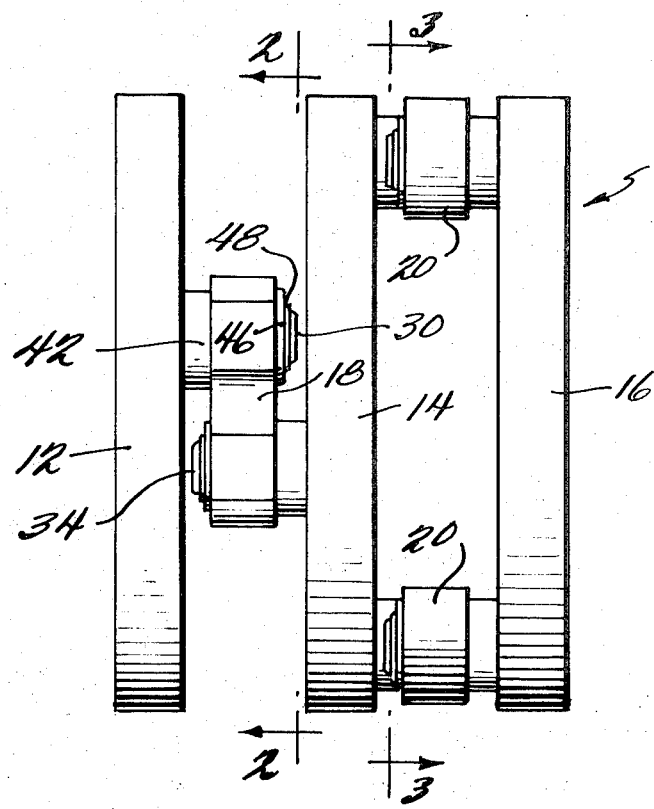
FIG. 1 is a side elevational view of a coupling embodying the principles of the present invention.
Figure 2:
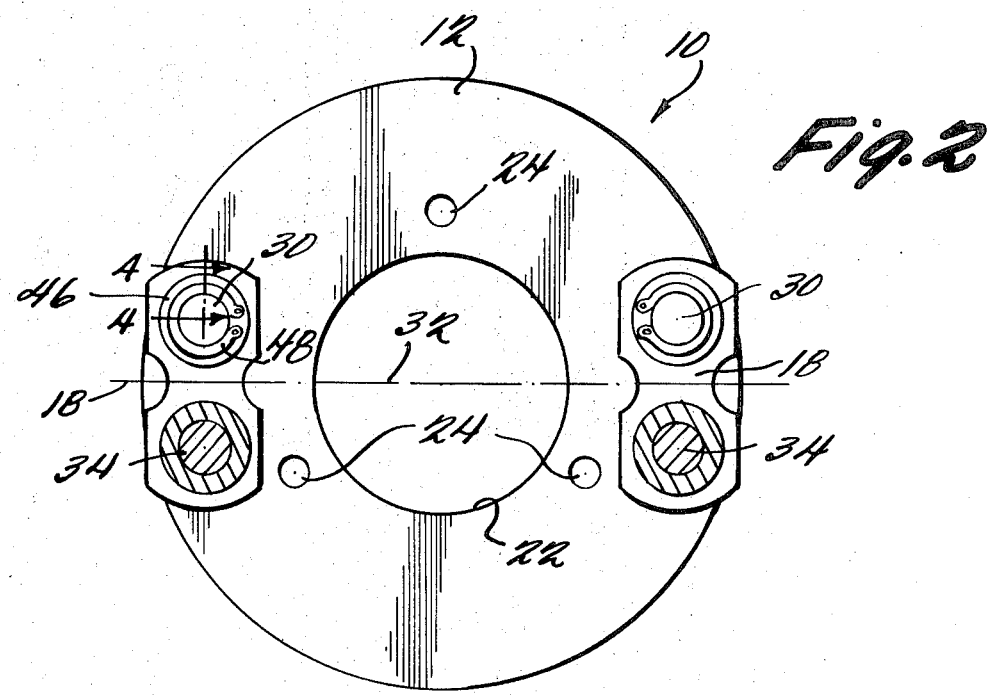
FIG. 2 is a sectional view taken along the line 2—2 of FIG. 1.

Referring now more particularly to the drawings, there is shown in FIGS. 1–3 thereof, a coupling, generally indicated at 10, embodying the principles of the present invention. In general, the coupling 10 includes three rotary members 12, 14 and 16 arranged so that the member 14 constitutes a central rotary member disposed between first and second outer rotary members 12 and 16 respectively. The coupling also includes a first pair of parallel links 18 pivotally interconnected between the first outer rotary member 12 and the central rotary member 14 and a second pair of links 20 pivotally connected between the central rotary member 14 and the second outer rotary member 16.

The rotary members 12, 14 and 16 are preferably of generally flat disk-like configuration normally disposed with their flat sides generally parallel. The shape of each rotary member is symmetrical about an axis of symmetry and, as shown, is generally of circular peripheral configuration. It will be understood that each of the outer disk-like members is provided with suitable means for detachably fixedly connecting the same to a shaft or the like. As shown in FIG. 2, the rotary member 12 is formed with a central opening 22 and has a plurality of annularly spaced threaded openings 24 extending axially therethrough. The threaded openings 24 are adapted to receive bolts which serve to secure a radial flange of a flanged collar (not shown) to the exterior surface of the rotary member 12. As shown in FIG. 3, a similar central opening 26 and threaded openings 28 are formed in the outer disk-like member 16 for similar purposes. It will be understood that other arrangements for effecting the connection to the shafts may be provided, such as forming integral collar portions on the outer disk members or the like. It will also be understood that the central disk-like member 14 may be either solid or provided with a central opening similar to the central openings 22 and 26 provided in the outer members 12 and 16.

Referring now more particularly to FIG. 2, it will be noted that one of the ends of the links 18 is pivotally connected with the outer disk-like member 12 by a pair of shafts 30 fixedly secured to the member 12 and extending from the inward face thereof toward the central member 14. In the embodiment shown, the shafts 30 are fixed within appropriate openings formed through the disk-like member 12 as by a press fit or the like. In this regard it will be noted that with this arrangement the portions of the shafts filling the openings become, in essence, a part of the rotary member so that the openings provided for the shafts need not be considered in the symmetrical relationship of the rotary members. The shafts 30 are positioned on the rotary member 12 so that their axes are disposed in equally spaced parallel relation with the symmetrical axis of the member 12. In addition, the axes are disposed in equally spaced relation on one side of a plane, indicated at 32 in FIG. 2, passing through the symmetrical axis of the member 12.

The opposite ends of the links 18 are pivotally connected to the central member 14 by a pair of shafts 34 suitably fixed to the central member 14 so as to extend from the face thereof adjacent the member 12 in a direction toward the latter. The shafts 34 are positioned with respect to the central rotary member 14 so that the axes thereof are disposed in equally spaced parallel relation with the symmetrical axis of the central member 14 and in equally spaced relation on the opposite side of a plane passing through the symmetrical axis thereof, similar to the plane 32. The spacing of the axes of the shafts 30 and 34 from the plane 32 is equal.

Referring now more particularly to FIG. 3, one of the ends of the links 20 is connected to the outer disk-like member 16 by a pair of shafts 36 suitably fixed to the rotary member 16 and extending outwardly from the inward face thereof toward the central rotary member 14. As shown in FIG. 3, the shafts 36 are positioned with respect to the member 16 so that the axes thereof are disposed in equally spaced parallel relation with the symmetrical axis of the member 16 and in equally spaced relation on one side of a plane, indicated at 38 in FIG. 3, passing through the symmetrical axis of the member 16.

The opposite ends of the links 20 are connected with the central rotary member 14 by a pair of shafts 40 which are suitably fixed to the central member 40 and extend outwardly of the face thereof adjacent the member 16 in a direction toward the latter. These shafts are positioned with respect to the central member so that their axes are disposed in equally spaced parallel relation with the symmetrical axis of the central member 14 and in equally spaced relation on the opposite side of a plane similar to the plane 38 passing through the symmetrical axis of the central member 14 in generally perpendicular relation to the plane thereof previously mentioned similar to the plane 32.

It will be understood that when the coupling is connected between a pair of shafts in axial alignment with one another the axis of symmetry of each of the disk-like members 12, 14 and 16 will be disposed coincident with the axes of the shafts so that the planes 32 and 38 will pass through the axes of symmetry of all of the rotary members and be disposed in perpendicular relation with respect to one another. Also, when the coupling is in this aligned position, as shown in FIGS. 1–3, the links 18 extend from the shafts 30 or 34 in the same direction beyond the first plane 32 in symmetrical relation thereto. Likewise, the links 20 extend from the shafts 36 or 40 in the same direction beyond the plane 38 in symmetrical relation thereto. It will also be noted that when the coupling is in the aligned position, all of the links are disposed in symmetrical relation about the aligned axis of symmetry. The length of the links can be any desired dimension so long as the above-mentioned relationships are maintained. It is desirable, however, to maintain the length of the links to a minimum dimension sufficient to provide operation of the coupling within the desired misalignment range. Minimizing the length of the links permits the shafts associated therewith to be angularly displaced from the reference plane thereof a minimum number of degrees which materially aids in the force transmission of the coupling. In the embodiment shown, this angular inclination is approximately 7½°.

Normally, the coupling 10 would be used to interconnect shafts which are intended to be axially aligned during operation but which, due to tolerances and other factors, may be disposed or may be moved in operation slightly out of alignment in parallel offset relation. It will be noted that the present coupling when interconnecting two axially aligned shafts is dynamically balanced about the aligned axes of the shafts so that even at high speeds no vibrational imbalances or variations in angular speeds are introduced into the system thereby. The coupling is capable of transmitting high torque in operation, with one of the links 18 and 20 always in tension and the other always in compression.

The coupling 10 has the capability of accommodating a parallel offset movement between the shafts during operation as well as accommodating a set parallel offset relationship between the axes of the shafts. The extent of parallel offset displacement which can be accommodated is limited not so much by the capability of the coupling to move as by the amount of vibrational imbalance which can be allowed due to the high rotational speeds involved. Large amounts of parallel offset displacement are better accommodated by the coupling disclosed in my U.S. Pat. No. 3,242,694, which coupling is not suitable for the in-line or nearly in-line operation of the present coupling.

During parallel offset misalignment operation, it will be noted that during each revolution of the member 12, the links 18 will move into two positions displaced 180° from each other in which the links are in alignment with the direction of parallel offset. At these positions, the center member 14 is aligned with the member 12 and out of alignment with the member 16, the links 20 accommodating the misalignment. At two positions displaced 180° from each other and 90° out of phase with the first-mentioned two positions, the links 20 will move into alignment with the direction of parallel offset at which positions the center member 14 is aligned with the member 16 and out of alignment with the member 12, the links 18 accommodating the misalignment. Thus, during each revolution, the central member 14 will undertake two cycles of movement from a position of alignment with the member 12 to a position of alignment with the member 16 and back. These two successive cycles of movement of the center member are accommodated by pivotal movements of the links in opposite directions during successive cycles.

It is significant, that while the central member thus has a vibrational movement during operation, the vibrational movement is purely translational with respect to each outer member by virtue of the parallel link connection with each. In this way, no angular variation is introduced during operation so that each incremental angular movement imparted to the rotary member 12 during its rotation will be precisely imparted to the rotary member 16.

Referring now more particularly to FIG. 4, there is shown therein a preferred arrangement for effecting the pivotal connection between each of the links 18 and 20 and the shafts associated therewith. A typical connection is shown between the shaft 30 and link 18 in which a spacer collar 42 is mounted in surrounding relation to the shaft 30 between the member 12 and link 18. The surface of the collar opposite the member 12 is adapted to engage the inner edge of a needle bearing assembly 44, mounted within an appropriate opening in the link 18 in surrounding relation to the shaft 30. The needle bearing assembly 44 is preferably of the sealed type and may be of any conventional construction, an exemplary embodiment being the sealed shell type bearing SCE-PP series manufactured by INA. The outer edge of the bearing assembly is engaged by a washer 46 which is retained on the outer end of the shaft by a C-clip 48 engaged within a suitable annular groove formed in the shaft.

Needle bearing assemblies are preferred because of their lubricating qualities and the fact that most standard needle bearing assemblies provide a slight degree of angular movement (e.g. 5 minutes). Not all standard bearings are satisfactory, for example, metal sleeve bearings do not provide adequate service since they require rotational movement for proper lubrication and the relative movement between the links and shafts during operation (if any) is oscillatory pivotal movement rather than rotary movement.

With respect to the slight angular movement provided by the needle bearing assembly 44, this capability is desirable so as to render the coupling capable of accommodating slight misalignments other than the aforementioned parallel offset misalignment between the shafts being interconnected by the coupling 10. The accommodation of such additional misalignments can be greatly increased by utilizing a spherical bearing assembly 50, such as shown in FIG. 5, in lieu of the needle bearing assembly 44. Here again any conventional construction may be utilized, an exemplary embodiment being the assembly manufactured by McGill under the trademark SPHERE-ROL.

The additional functional advantages which can be achieved by the utilization of the bearing assembly 50 are graphically illustrated in FIGS. 6–8. FIG. 6 illustrates one static position of the coupling parts when used to interconnect two shafts which are disposed with their axes in parallel offset relation with respect to each other. This is the most common and usual misalignment accommodated by the coupling 10. FIG. 7 shows the one static position of the coupling 10 occasioned by axial displacement of aligned shafts in a direction away from each other. Clearly, axial displacement in the opposite direction can likewise be accommodated. FIG. 8 shows one static position of the coupling occasioned by an angular offset relationship between the connected shafts. It will be equally apparent that the coupling 10 is likewise capable of accommodating any combination or permutation of the three types of misalignments shown in FIGS. 6–8 whether initially provided or provided during operation.

It will be understood that conventional ball bearings as well as other types of roller bearings may be utilized in the present invention to accommodate the high speed high torques contemplated. Such bearings are not preferred because the advantages of misalignment accommodation, as indicated above, cannot be achieved therewith, even to the very limited extent of the needle bearing assembly 44.

It will also be understood that while the coupling of the present invention is particularly suited for high speed — high torque application, the coupling can be used in low speed — low torque applications as well, in which case sleeve bearings can be used, although here again, it is preferred to employ sleeve bearings of a self-lubricating material such as Teflon, nylon or the like rather than metal, since, as aforesaid, they require rotational movement for proper lubrication. Likewise, in low-speed applications, the links may be made of a self-lubricating material eliminating the need for separate bearings.

Another advantage of the parallel linkage connection of the rotary members of the present coupling is exemplified by the modified forms of the coupling 10 illustrated in FIGS. 9–11. This advantage is that increased torque transmission capability can be built into the coupling by the simple expedient of providing more than two links between adjacent rotary members. In accordance with the principles of the present invention, the arrangement of all the links should be symmetrical about the axis of rotation of the coupling when connecting in-line shafts. FIGS. 9–11 illustrate three modified forms in which four links are mounted between adjacent rotary members rather than two, as described above. In the forms illustrated in FIGS. 9 and 10, two links of each set of four links are arranged in the precise relationship previously described and hence, these links are designated by corresponding reference numerals. In the embodiment of FIG. 9, the coupling includes a first pair of additional links 52, associated with the links 18 and a second pair of additional links 54 associated with the links 20. Each of the links 52 and 54 is related to an associated link in an essentially parallel relationship. Thus, the links 52 are pivoted to the first outer member 12 by shafts 56 having their axes disposed in equal parallel spaced relation to the axis of symmetry of the member a distance greater than the spacing of the axes of the shafts 30. The axes of the shafts are also spaced equally from the plane 32 a distance equal to the spacing of the axes of the shafts 30.

The opposite ends of the links 52 are similarly pivotally connected to the central member 14 by shafts 58. Likewise, links 54 are pivotally interconnected between the outer member 16 and the central member 14, by shafts 60 and 62 respectively whose axes bear a relationship to the plane 38 and axes of the shafts 36 and 40 the same as the axes of the shafts 56 and 58 bear to the axes of shafts 30 and 34 respectively.

In FIG. 10, the coupling includes an additional pair of links 64 and 66 associated with the links 18 and 20 respectively in an essentially in-line relationship rather than the parallel relationship of FIG. 9. Thus, the links 64 are pivotally connected to the outer member 12 by a pair of shafts 68 disposed with their axes in equally spaced relation with the axes of the shafts 30, the equal spacing extending perpendicularly of the plane 32 in opposite directions so that the axis of one of the shafts 68 is spaced from the plane 32 on the shaft 30 side thereof a distance equal to the spacing between the axes of associated shafts 68 and 30 plus the distance of the axis of the associated shaft 30 to the plane 32 and the axis of the other shaft 68 is on the opposite side of the plane 32 a distance equal to the spacing between the axes of the associated shafts 68 and 30 minus the spacing of the axis of the associated shaft 30 from the plane 32.

The opposite ends of links 64 are pivotally connected to the central member 14 by a pair of shafts 70 having their axes disposed in a similar relationship to the axes of shafts 34. The links 66 are pivotally interconnected between the outer member 16 and the central member 14 by two pairs of shafts 72 and 74 respectively. The axes of the shafts 72 and 74 bear similar relationships to the plane 38 and the axes of shafts 36 and 40 respectively, as that previously recited with respect to the shafts 68.

The arrangement of FIG. 11 is an in-line arrangement similar to that of FIG. 10 except that each in-line pair of links is positioned essentially symmetrical to the associated planes 32 and 38. Thus, two pairs of in-line links 76 are mounted between the members 12 and 14, one of the ends of which are pivotally connected to the member 12 by shafts 78 and the other ends of which are pivotally connected to the central member 14 by shafts 80. The axes of each pair of shafts 78 associated with each pair of in-line links 76 are disposed on opposite sides of the plane 32, one a predetermined distance and the other the predetermined distance plus the distance between the axes of associated shafts 78 and 80. The axes of corresponding shafts of each pair are disposed in equally spaced parallel relation with the axis of symmetry of the member 12. The axes of the shafts 80 bear a mirror image relationship to the plane 32 as the axes of shafts 78.

The coupling of FIG. 11 also includes a second set of four links 82 having one of the ends thereof pivotally connected to the outer member 16, as by four shafts 84 and the other ends thereof pivotally connected to the central member 14, as by four shafts 86. The axes of the shafts 84 and 86 bear the same relationship to the plane 38 as the axes of the shafts 78 and 80 bear to the plane 32.

It will be noted that in each of the embodiments shown in FIGS. 9–11, the action of the various components is the same as that previously described with the additional two pairs of links and associated shafts serving to assume a proportionate share of a greater torque load where necessary.

Another advantage of the basic link arrangement of the present invention is illustrated in the embodiment shown in FIG. 12. Since the pivotal connection of the links 18 and 20 with the outer members 12 and 16 are disposed on one side of the planes 32 and 38, it is possible to split the outer member 12 and 16 along the planes 32 and 38 respectively without disrupting the basic assembly of the coupling and thus render the coupling capable of being conveniently connected between two shafts without disturbing the mounting of the shafts. As shown in FIG. 12, such a coupling, indicated generally at 88 includes two outer members 90 and 92 of disk-like configuration, having integral axially outwardly extending hub portions, a central member 94 and two pairs of links 96 and 98 pivotally interconnected respectively between outer member 90 and 92 and the central member 94 in an arrangement similar to that of the coupling 10. The first outer member 90 is split into two parts, 100 and 102, along a plane corresponding to the plane 32 previously described. The second outer member 92 is split into two parts, 102 and 106, along a plane corresponding to the plane 38 previously described.

It can be seen that the parts 102 and 106 are thus separate from the remaining elements of the coupling 88 which are retained in accurately assembled relation. By separating the parts 102 and 106, the coupling 88 can be conveniently connected between two shafts 108 and 110 mounted in closely spaced relation with respect to each other a distance less than the total axial dimension of the assembled coupling 88 where connection would otherwise require movement of one of the shafts. The manner in which the coupling 88 is connected is graphically illustrated in phantom lines in FIG. 12. The important consideration is that the assembly can be moved laterally into a preliminary operative relation to the shafts 108 and 110 by initially pivoting either the part 100, as shown, (or the part 104) into a position displaced from its normal in-line position (e.g. 90° as shown) sufficient to permit the part 104 to clear shaft 110. After part 100 is engaged with the shaft 108, part 104 and the central member 94 are pivoted into the in-line position thus effecting engagement of the part 104 with the shaft 110. The separate parts 102 and 106 can then be fixed respectively to the parts 100 and 104 in engaged relation to the respective shafts 108 and 110 by any suitable means, such as bolts 112 or the like.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. A coupling for drivingly interconnecting a pair of shafts or the like in axial alignment and axial misalignment operable to transmit therebetween high rotational speeds and torques comprising
    three generally flat disk-like members mounted with their flat sides generally parallel in an arrangement in which a central disk-like member is disposed between first and second outer disk-like members,
    each of said disk-like members having a shape symmetrical about an axis of symmetry which is aligned with the axis of the shafts to be connected when in said axially aligned relation,
    first and second pairs of shafts fixed to said central disk-like member and extending outwardly of opposite faces thereof toward said first and second outer disk-like members respectively,
    the axes of each pair of shafts being disposed in equally spaced parallel relation with the symmetrical axis of said central disk-like member,
    the axes of said first pair of shafts being disposed in equally spaced relation to one side of a first plane passing through the symmetrical axis of said central disk-like member,
    a first pair of parallel links disposed between said first disk-like member and said central disk-like member pivotally mounted on said first pair of shafts and extending therefrom in the same direction beyond said first plane in symmetrical relation thereto when the shafts to be connected are in said axially aligned relation,
    a third pair of shafts fixedly mounted on said first disk-like member and pivotally interconnected with said first pair of links,
    the axes of said third pair of shafts being disposed in equally spaced parallel relation with the symmetrical axis of said first outer disk-like member and with said first plane on the opposite side thereof,
    the axes of said second pair of shafts being disposed in equally spaced relation on one side of a second plane passing through the symmetrical axis of said central disk-like member in generally perpendicular relation to said first plane,
    a second pair of parallel links disposed between said second outer disk-like member and said central disk-like member pivotally mounted on said second pair of shafts and extending therefrom in the same direction beyond said second plane in symmetrical relation thereto when the shafts to be connected are in said axially aligned relation, and
    a fourth pair of shafts fixedly mounted on said second disk-like member and pivotally interconnected with said second pair of links,
    the axes of said fourth pair of shafts being disposed in equally spaced parallel relation with the symmetrical axis of said second outer disk-like member and with said second plane on the opposite side thereof.

2. A coupling as defined in claim 1 wherein each of said links is pivotally connected to each shaft associated therewith by a needle bearing assembly.

3. A coupling as defined in claim 1 wherein each of said links is pivotally connected to each shaft associated therewith by a spherical roller bearing assembly.

4. A coupling as defined in claim 1 including fifth and sixth pairs of shafts fixed to said central disk-like member and extending outwardly of opposite faces thereof toward said first and second outer disk-like members respectively,
    the axes of said fifth and sixth pairs of shafts being disposed in equally spaced parallel relation with the symmetrical axis of said central disk-like member a distance greater than the spacing of the axes of said first pair of shafts,
    the axes of said fifth pair of shafts being disposed in equally spaced relation on said one side of said first plane a distance equal to the spacing of the axes of said first pair of shafts,
    a third pair of parallel links disposed between said first disk-like member and said central disk-like member pivotally mounted on said first pair of shafts and extending therefrom in the same direction beyond said first plane in symmetrical relation thereto when the shafts to be connected are in said axially aligned relation,
    a seventh pair of shafts fixedly mounted on said first disk-like member and pivotally interconnected with said third pair of links,
    the axes of said seventh pair of shafts being disposed in equally spaced parallel relation with the symmetrical axis of said first outer disk-like member and with said first plane on the opposite side thereof,
    the axes of said sixth pair of shafts being disposed in equally spaced relation on said one side of said second plane a distance equal to the spacing of the axes of said second pair of shafts,
    a fourth pair of parallel links disposed between said second outer disk-like member and said central disk-like member pivotally mounted on said eighth pair of shafts and extending therefrom in the same direction beyond said second plane in symmetrical relation thereto when the shafts to be connected are in said axially aligned relation, and an eighth pair of shafts fixedly mounted on said second disk-like member and pivotally interconnected with said fourth pair of links, the axes of said eighth pair of shafts being disposed in equally spaced parallel relation with the symmetrical axis of said second outer disk-like member and with said second plane on the opposite side thereof.

5. A coupling as defined in claim 1 including fifth and sixth pairs of shafts fixed to said central disk-like member and extending outwardly of opposite faces thereof toward said first and second outer disk-like members respectively, a third pair of parallel links similar to said first pair of links disposed between said first disk-like member and said central disk-like member pivotally mounted on said fifth pair of shafts and extending therefrom in the same direction in alignment with said first pair of links when the shafts to be connected are in said axially aligned relation, a seventh pair of shafts fixedly mounted on said first disk-like member and pivotally interconnected with said fifth pair of links, a fourth pair of parallel links similar to said second pair of links disposed between said second outer disk-like member and said central disk-like member pivotally mounted on said sixth pair of shafts and extending therefrom in the same direction in alignment with said second pair of links when the shafts to be connected are in said axially aligned relation, and an eighth pair of shafts fixedly mounted on said second disk-like member and pivotally interconnected with said fourth pair of links.

6. A coupling as defined in claim 1 wherein said first outer disk-like member is split into two parts along said first plane and has means for detachably fixedly securing the two parts thereof together, and said second outer disk-like member is split into two parts along said second plane and has means for detachably fixedly securing the two parts thereof together.

7. A coupling for drivingly interconnecting a pair of shafts or the like in axial alignment and axial misalignment operable to transmit therebetween high rotational speeds and torques comprising three generally flat disk-like members mounted with their flat sides generally parallel in an arrangement in which a central disk-like member is disposed between first and second outer disk-like members, each of said disk-like members having a shape symmetrical about an axis of symmetry which is aligned with the axis of the shafts to be connected when in said axially aligned relation, first and second sets of four parallel shafts fixed to said central disk-like member and extending outwardly of opposite faces thereof toward said first and second outer disk-like members respectively, a first set of four parallel links disposed between said first disk-like member and said central disk-like member pivotally mounted on said first set of four shafts and extending therefrom in the same direction, a second set of four parallel links disposed between said second outer disk-like member and said central disk-like member pivotally mounted on said second set of shafts and extending therefrom in the same direction, said first set of links extending in a direction generally perpendicular to the direction of extent of said second set of links when the shafts to be connected are in said axially aligned relation, all of said links being arranged generally symmetrical with respect to said axis of symmetry when the shafts to be connected are in said axially aligned relation, a third set of four shafts fixed to said first outer disk-like member and pivotally interconnected with said first set of links in equally spaced relation to the pivotal connections thereof to said first set of shafts, and a fourth set of four shafts fixed to said second outer disk-like member and pivotally interconnected with said second set of links in equally spaced relation to the pivotal connections thereof to said second set of shafts.

8. A coupling as defined in claim 7 wherein two shafts of said first set of shafts have their axes spaced equally from the symmetrical axis of said central disk-like member and from a first plane passing through the symmetrical axis of said central disk-like member on one side thereof and two shafts of said second set of shafts have their axes spaced equally from the symmetrical axis of said central disk-like member and from a second plane passing through the symmetrical axis of said central disk-like member generally perpendicular to said first plane on one side thereof.

9. A coupling as defined in claim 8 wherein the axes of the other two shafts of said first set of shafts are equally spaced from the axes of the first-mentioned two shafts thereof respectively in opposed directions parallel to said first plane and the axes of the other two shafts of said second set of shafts are equally spaced from the axes of the first-mentioned two shafts thereof respectively in opposed directions parallel to said second plane.

10. A coupling as defined in claim 8 wherein the axes of the other two shafts of said first set of shafts are equally spaced from the axes of the first-mentioned two shafts thereof respectively in opposed directions perpendicular to said first plane and the axes of said other two shafts of said second set of shafts are equally spaced from the axes of the first-mentioned two shafts thereof respectively in opposed directions perpendicular to said second plane.

11. A coupling as defined in claim 8 wherein the axes of the other two shafts of said first set of shafts are equally spaced from the axes of the first-mentioned two shafts thereof respectively in the same direction perpendicular to said first plane and the axes of said other two shafts of said second set of shafts are equally spaced from the axes of the first-mentioned two shafts thereof respectively in the same direction perpendicular to said plane.

12. A coupling for drivingly interconnecting a pair of shafts or the like in axial alignment and axial misalignment comprising three rotary members mounted in an arrangement in which a central rotary member is disposed between first and second outer rotary members, each of said outer rotary members having a shape symmetrical about an axis of symmetry which is aligned with the axis of the shafts to be connected when in said axially aligned relation, a first pair of shafts fixed to said first rotary member and extending outwardly thereof toward said central rotary member, the axes of said first pair of shafts being disposed in equally spaced parallel relation with the symmetrical axis of said first rotary member and in equally spaced relation on one side of a first plane passing through the symmetrical axis of said first rotary member, a first pair of parallel links disposed between said first rotary member and said central rotary member pivotally mounted on said first pair of shafts and extending therefrom in the same direction beyond said first plane, a second pair of shafts fixedly mounted on said central rotary member and pivotally interconnected with said first pair of links, a third pair of shafts fixed to said second rotary member and extending outwardly thereof toward said central rotary member, the axes of said third pair of shafts being disposed in equally spaced relation on one side of a second plane passing through the symmetrical axis of said second rotary member in generally perpendicular relation to said first plane, a second pair of parallel links disposed between said second outer rotary member and said central rotary member pivotally mounted on said third pair of shafts and extending therefrom in the same direction beyond said second plane, a fourth pair of shafts fixedly mounted on said central rotary member and pivotally interconnected with said second pair of links, said first rotary member being split into two parts along said first plane and having means for detachably fixedly securing the two parts thereof together, said second rotary member being split into two parts along said second plane and having means for detachably fixedly securing the two parts thereof together.

\* \* \* \* \*